United States Patent Office 2,873,444
Patented Feb. 10, 1959

2,873,444

PULSE SYNCHRONIZER

Walter N. Dean, Hempstead, N. Y., assignor to Sperry Rand Corporation, a corporation of Delaware Application September 15, 1949, Serial No. 117,917

17 Claims. (Cl. 343—103)

This invention relates to automatic synchronizer circuits and particularly to apparatus for generating and precisely synchronizing a series of pulses in predetermined time-phase relation with recurrent control pulses.

Automatic systems for producing and synchronizing a series of pulses with a series of recurrent control pulses are known in the prior art. Generally, such systems are actuated by the amplitude of the control pulses and hence are adversely affected by random noise signals and by changes in the amplitude or wave form of the control pulses so that the synchronized pulses do not always occur in precisely the same time-phase relation with reference to the respective control pulses; e. g., in Loran systems pulses of carefully controlled shape are transmitted in predetermined time relation from two locations and receiving equipment on a mobile craft is employed to receive and detect the pulses and to provide a measure of the time-delay between the pulses received from the two locations, from which a hyperbolic line of position of the craft is ascertained. The accuracy with which the line of position is determined depends, of course, upon the accuracy of the time-delay measurement. This, in turn, has in the past been limited by the appreciable effects of sky-wave interference (night effect) and consequence distortion of the pulse wave forms. Prior pulse timing circuits and devices have been quite vulnerable to this "sky-wave" distortion, and vulnerable also to the effects of noise in the output of the Loran radio receiver.

These difficulties are substantially overcome in the present invention by employing a large time-constant servo control which is actuated by the rate of increase in the magnitude of the Loran pulses to effect synchronization. In a preferred embodiment of the invention, the Loran pulses are sampled twice during the leading edge of each of the respective pulses, the first sample being taken when the respective Loran pulses attain a predetermined magnitude and the second sample being taken a fixed time thereafter. The output of the first sampling apparatus is employed to control a pulse generator which produces a first series of pulses in which each pulse is caused to occur a fixed time earlier than the time that the respective Loran pulses attain the predetermined magnitude. A delay circuit is employed between the output of the pulse generator and the control circuit of the first sampling apparatus to complete a servo loop which serves to activate the first sampling apparatus when the respective control pulses attain the predetermined amplitude. The second sampling apparatus is part of a control circuit which is activated by pulses delayed with respect to the pulses which activate the first sampling apparatus and its output is employed to control a variable delay circuit which is responsive to the first series of pulses and which serves to produce a second series of pulses in which the respective pulses are caused to occur a time after the respective pulses of the first series which varies directly with the rate of increase in the magnitude of the respective Loran pulses during the time interval between the two sampling periods.

Accordingly, it is an object of this invention to provide an improved Loran receiving system of great accuracy and reliability which is not adversely affected by sky-wave interference or changes in the amplitude of the pulses received or by random noise signals in the output of the Loran receiver.

Another object of this invention is to provide apparatus for automatically synchronizing a series of pulses in predetermined time-phase relation with recurrent control pulses wherein the synchronization is not adversely affected by random noise signals or by changes in the amplitude or wave form of the control pulses under normal conditions.

Another object of the invention is to provide automatic pulse synchronization apparatus which is responsive to the rate of increase in the magnitude of each of the control pulses.

A further object of this invention is to provide apparatus for automatically synchronizing a series of pulses with recurrent control pulses so that each pulse of the series is initiated at precisely the same instant that each of the control pulses is initiated.

A still further object of this invention is to provide apparatus for automatically measuring the rate of increase in the magnitude of each pulse of a series of pulses.

Further objects and advantages of the invention will be apparent from the following description, the appended claims and the drawings, in which, Fig. 1 is a block diagrammatic disclosure of the synchronizer apparatus showing how it may be employed in a Loran receiving system;

In the receiving system, two substantially identical pulse synchronizer systems are employed to produce two series of pulses in which each pulse of one series is caused to occur precisely at the instant that a master pulse is received from the Loran transmitting system and each pulse of the other series is caused to occur precisely at the instant that a slave pulse is received from the Loran transmitting system. The two series of synchronized pulses are compared on the screen of a cathode-ray tube or in other comparison apparatus in order to determine the interval of time between the master and slave pulses.

In the discussion of the preferred embodiment of this invention which follows, frequency reference will be made to Fig. 2 which shows the wave form of and time relations between the various signals which occur in the apparatus disclosed in Fig. 1. It is to be observed that the letter which identifies each curve in Fig. 2 is also employed in Fig. 1 to identify the circuit which conveys the corresponding signal.

Figure 1:
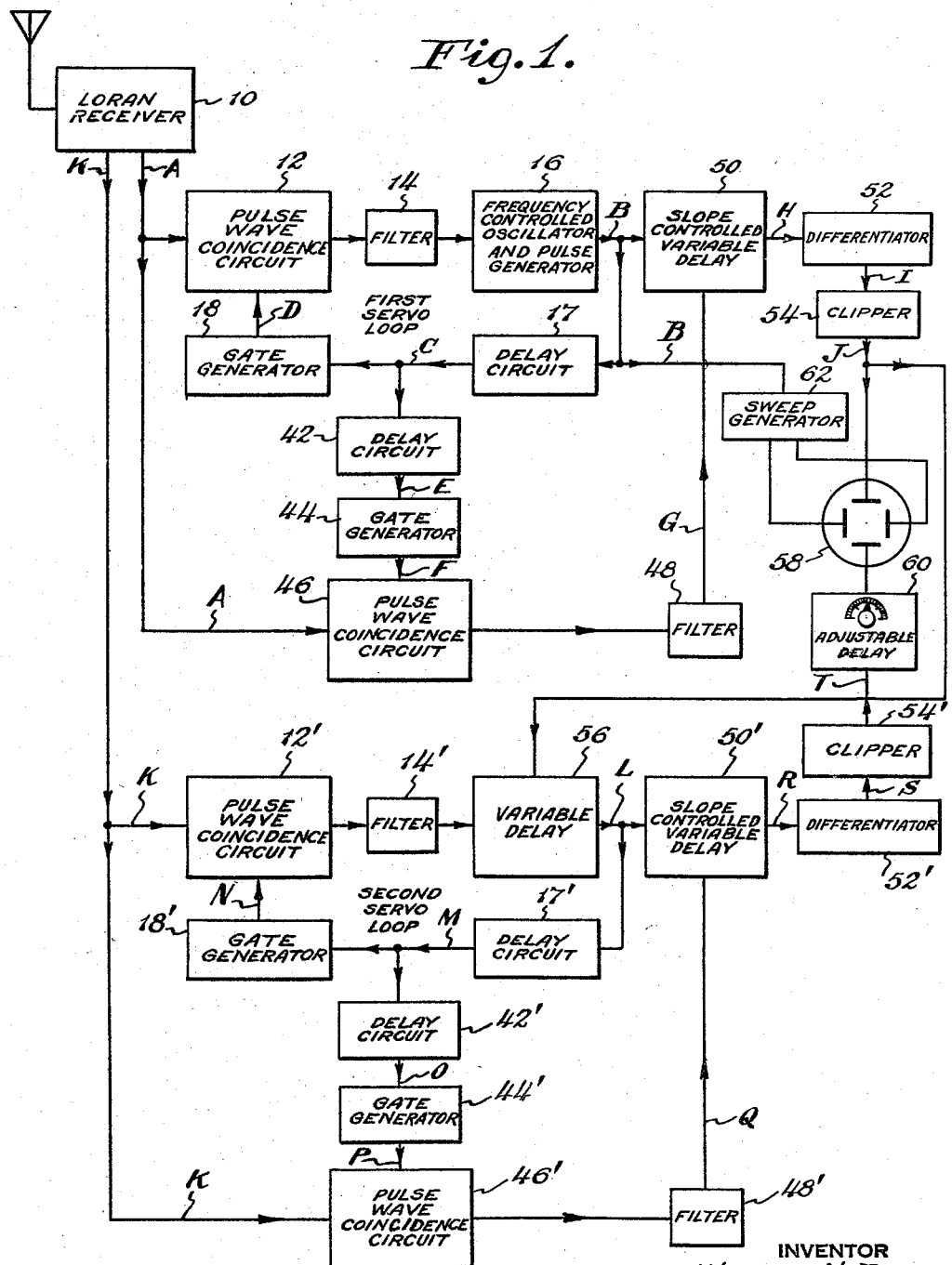
Fig. 1 shows my invention applied to a Loran receiving system. For convenience, this description is limited to a Loran receiving system adapted to receive the master and slave radio frequency signals produced by one pair of Loran transmitters.
Figure 2:
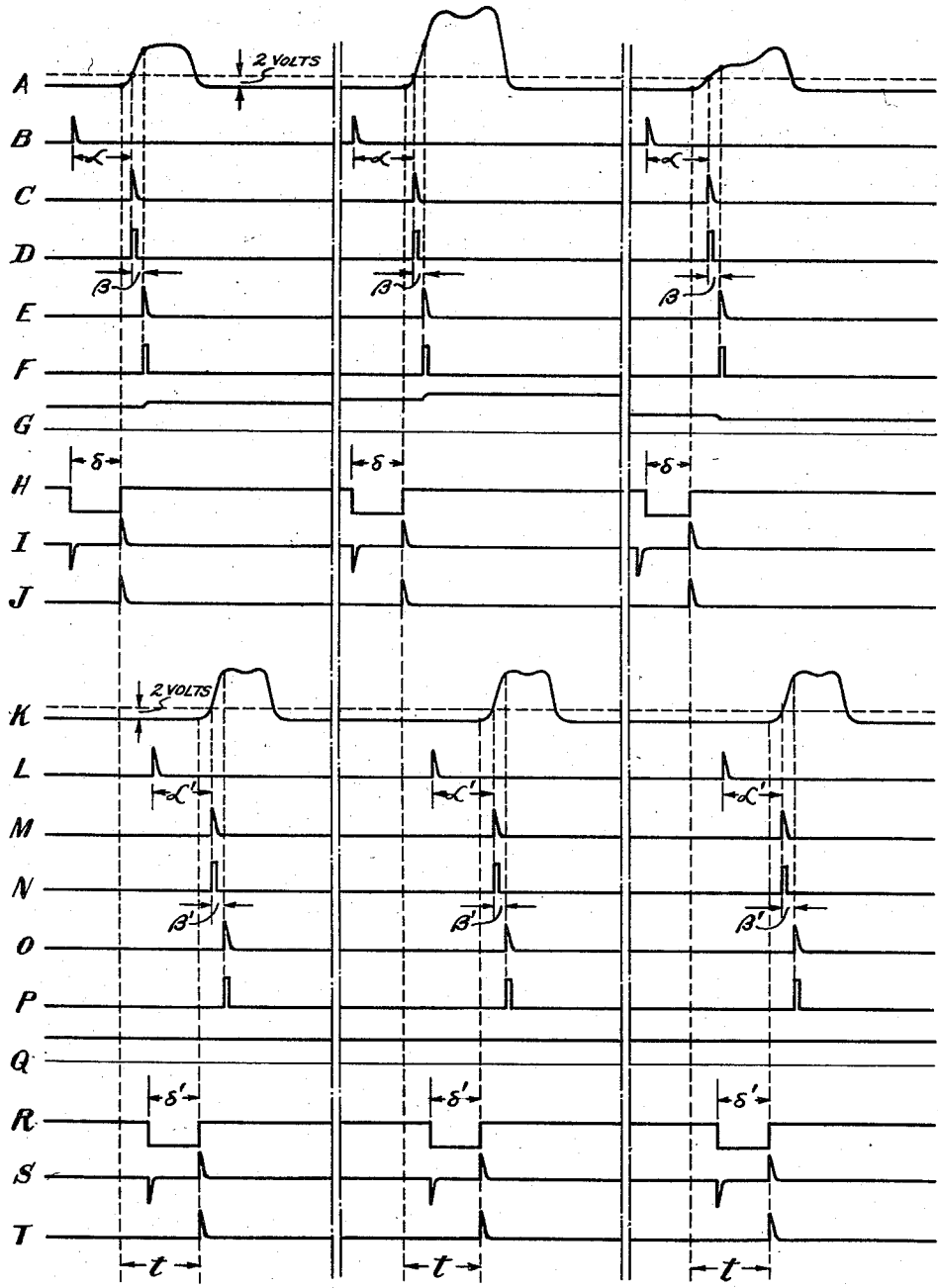
Fig. 2 shows various curves representing the wave form of and time relationships between signals which are produced in various parts of the apparatus shown in Fig. 1.

Referring now to Figs. 1 and 2, the Loran receiver 10 serves to receive and detect the master and slave signals produced by a Loran transmitting system (not shown). The detected master pulses are produced at A and the detected slave pulses are produced at K.

The wave forms shown for the master pulses A and the slave pulses K are illustrative of the wave forms actually received under three normal operating conditions in which the receiving apparatus is located approximately a fixed distance from the slave transmitter and a variable distance from the master transmitter of the Loran system. The first master pulse A is not affected by sky-wave interference. The second and third master pulses A are affected by sky-wave interference which distorts the trailing edges of these pulses. The difference in the amplitudes of the three master pulses A results from differences in the distance between the Loran receiver and the master transmitter of the Loran system and to some extent from differences in the atmospheric conditions. The three slave pulses K are illustrative of a fixed set of receiving conditions in which the pulses are of constant amplitude and each pulse is affected by sky-wave interference.

The master pulses A are applied to a first servo loop which comprises a pulse wave coincidence circuit 12, a filter 14, a frequency controlled oscillator and pulse generator 16, a delay circuit 17, and a gate generator 18. The pulse wave coincidence circuit 12 may be the four diode type shown on page 12 of the Proceedings of the Institute of Radio Engineers for January 1943. The filter 14, which may be a conventional type employing lumped constants, has a long time-constant with respect to the repetition frequency of the received master pulses A. The frequency controlled oscillator and pulse generator 16 may be either of the types shown in Figs. 3 and 4.

Figure 3:
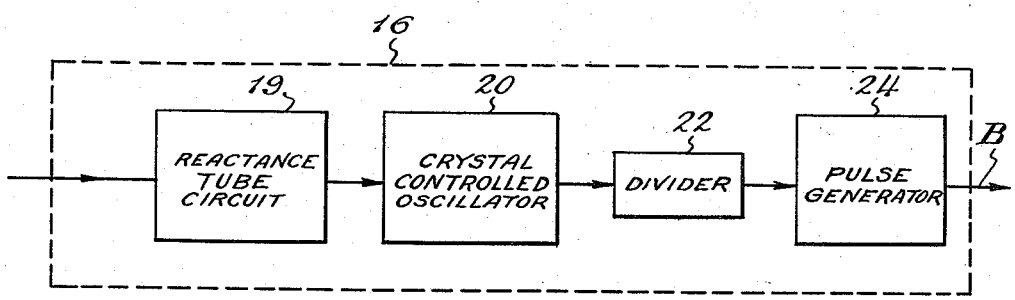

Fig. 3 shows a frequency controlled oscillator and pulse generator 16 which is suitable for use in Loran systems in which the pulses have a single repetition rate. A reactance tube unit 19, which is responsive to the output of the filter 14, is employed to vary the frequency of a crystal controlled oscillator 20 over a small range. The frequency of the output of oscillator 20 is reduced to the repetition rate of the master pulses A by a divider 22, which may be a conventional type, and the output of the divider 22 is applied to a pulse generator 24 which serves to produce a pulse of short duration in response to each cycle of the output of the divider 22.

Figure 4:
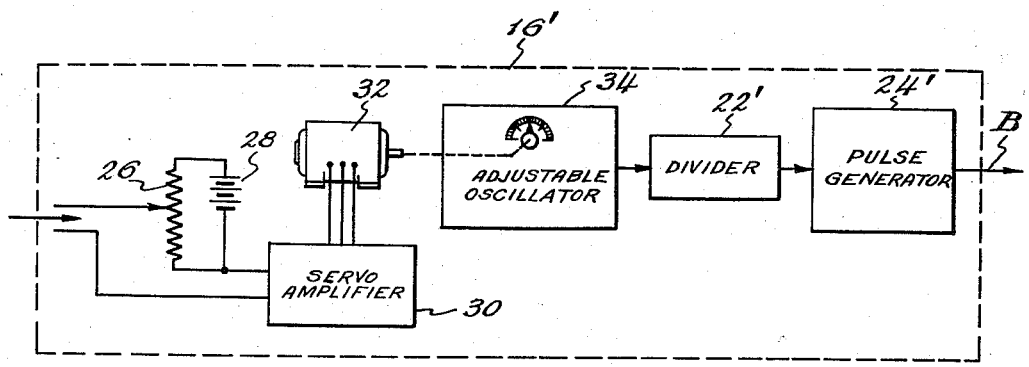
Figs. 3 and 4 show two alternative embodiments of the frequency controlled oscillator and pulse generator shown in the block diagram of Fig. 1.

The alternative frequency controlled oscillator and pulse generator 16' shown in Fig. 4 is suitable for use in Loran systems in which more than one transmitter system is employed and each transmitter system produces pulses having repetition rate which differs from the repetition rate of the pulses produced by the other transmitter systems. A potentiometer 26 which is connected across a battery 28 serves to complete the circuit between the filter 14 and a servo amplifier 30, and the voltage introduced into the servo loop by the potentiometer 26 is of opposite polarity to the voltage produced by the filter 14. The output of the servo amplifier 30 is applied to a servomotor 32 which serves to control the frequency of an adjustable oscillator 34 over the required frequency range. The frequency of the output of the adjustable oscillator 34 is reduced to the repetition rate of the master pulses A by a divider 22', which may be the same type as the divider 22, and the output of the divider 22' is applied to a pulse generator 24' which may be the same type as the pulse generator 24 and which serves to produce a pulse of short duration in response to each cycle of the output of the divider 22'.

Thus, the frequency controlled oscillator and pulse generator 16 serves to produce a series of pulses B which has a repetition rate equal to the repetition rate of master pulses A. These pulses B are applied to a delay circuit 17 which may be a conventional type employing lumped constants, and it serves to produce pulses C which are delayed a time α after pulses B. The pulses C are applied to a gate generator 18 which may be a conventional type and which serves to produce a series of gates D in which each gate D is coincident with a pulse of the series of pulses C and is of relatively short duration with respect to the duration of the master pulses A. The gate pulses D are applied to the pulse wave coincidence circuit 12 and serve to activate the pulse wave coincidence circuit 12 and cause it to sample the master pulses A and produce a variable output voltage which is proportional to the magnitude of the respective master pulses A during each sampling period. The voltage produced by the pulse wave coincidence circuit 12 is smoothed by the filter 14 and applied to the control circuit of the frequency controlled oscillator and pulse generator 16.

The circuit constants of the first servo loop are proportioned so that the frequency controlled oscillator and pulse generator 16 is caused to produce a series of pulses B which are in synchronism with the master pulses A and so that the pulses C, which occur a fixed time α later than the respective pulses B, are caused to occur when the leading edges of the respective master pulses A attain a predetermined magnitude, such as two volts for example. If the frequency controlled oscillator and pulse generator 16 shown in Fig. 3 is employed, this may be accomplished by adjusting the fixed bias voltage on the grid of the reactance tube. If the frequency controlled oscillator and pulse generator 16' shown in Fig. 4 is employed, this may be accomplished by adjusting potentiometer 26.

The pulses A, B and C are applied to a first control circuit which comprises the delay circuits 17 and 42, a gate generator 44, a pulse wave coincidence circuit 46, a filter 48, and a slope controlled variable delay unit 50. The delay circuit 42 may be a conventional type employing lumped constants and it serves to produce a series of pulses E which are delayed a fixed time β after pulses C. Gate generator 44 may be the same type as generator 18, and it serves to produce a series of gates F in which each gate F is coincident with a pulse of series of pulses E and of relatively short duration compared to the duration of the master pulses A. The pulse wave coincidence circuit 46 may be the same type as circuit 12 and it serves to sample the leading edges of the master pulses A during each gate pulse F to produce a voltage which is proportional to the magnitude of the master pulses A during each sampling period. The output of the pulse wave coincidence circuit 46 is applied to a filter 48 which may be a conventional type employing lumped constants, and it has a long time-constant with respect to the time-constant of filter 14. The output of the filter 48 is a variable voltage G having a magnitude which varies directly with the rate of increase of the respective master pulses A during the time interval β between each pair of gates D and F, and this signal G is applied to the control circuit of a slope controlled variable delay unit 50 which may be a variable-delay one-shot multivibrator such as the type disclosed on page 591 of the book "Electronic Instruments," by Greenwood, Holdam and MacRae, published by the McGraw-Hill Book Company in 1948.

Pulses B are applied directly to the slope controlled variable delay unit 50 and serve to initiate the gate pulses H produced thereby. The output G of the filter 48 serves to control the duration of each gate pulse H so that the duration δ of each gate pulse H varies directly with the magnitude of signal G. The slope controlled variable delay unit 50 is adjusted so that the signal G causes the trailing edges of each of the gates H to occur precisely at the instant that the respective master pulses A are initiated.

The output H of the slope controlled variable delay unit 50 is applied to a differentiator 52 which may be a conventional type and which serves to produce a series of alternative negative and positive pulses I coincident with the leading and trailing edges of each gate H.

The pulses I are applied to a clipper circuit 54 which may be a conventional type and which serves to pass only the pulses which are of positive polarity, thereby producing a series of pulses J in which each pulse is precisely coincident with the true starting points of the respective master pulses A.

The slave pulses K which are produced by the Loran receiver 10 are applied to a second servo loop comprising a pulse wave coincidence circuit 12', a filter 14', a variable delay unit 56, a delay circuit 17' and a gate generator 18'. The circuit elements of this servo loop are the same as the first servo loop except that the variable delay circuit 56 is substituted for the frequency controlled oscillator and pulse generator 16 so as to minimize the equipment required. The variable delay 56 may be the same type as slope controlled variable delay 50, for example. It receives the pulses J and produces corresponding output pulses L which are delayed a time with respect to pulses J which varies directly as the voltage produced by the pulse wave coincidence circuit 12' and the filter 14'. Thus the pulses L are in synchronism with and each pulse occurs a predetermined time before the respective slave pulses K.

The pulses L are applied to the delay circuit 17' which serves to produce pulses M which are delayed a time $\alpha'$ after the pulses L. Pulses M are applied to the gate generator 18' which produces gates N which serve to activate the pulse wave coincidence circuit 12', thereby controlling this servo loop in a manner analogous to that described above with reference to the first servo loop.

Pulses K, L and M are applied to a second control circuit which is the same as the first control circuit and comprises the delay circuits 17' and 42', a gate generator 44', a pulse wave coincidence circuit 46', a filter 48' and a slope controlled variable delay unit 50'.

The second control circuit functions in a manner analogous to that described above with reference to the first control circuit to produce pulses O which are delayed a fixed time $\beta'$ after the pulses M, gates P which are coincident with the pulses O, and a control signal Q which has a magnitude determined by the amplitude of slave pulses K during each of the sampling periods P. In the example under consideration, the slave pulses K are of constant amplitude; hence signal Q is of constant magnitude.

The gate pulses R are produced by the slope control variable delay unit 50', and these gate pulses R have a duration $\delta'$ which varies directly with the magnitude of signal Q. The gates R are applied to differentiator 52' which may be the same type as differentiator 52 and which serves to produce a series of alternate negative and positive pulses S coincident with the leading and trailing edges of each gate R.

Pulses S are applied to a clipper 54' which may be the same type as the clipper 54 and which serves to pass only the pulses which are positive polarity, thereby producing a series of pulses T in which each pulse is precisely coincident with the true starting point of the respective slave pulses K.

In order to compare the time delay $t$ between the respective master pulses A and the respective slave pulses K, pulses J are applied directly to one of the vertical deflecting plates of a cathode-ray tube 58 and pulses T are applied to a manually adjustable delay circuit 60 which may be a conventional type, and the output of delay circuit 60 is applied to the other vertical deflecting plate of the cathode-ray tube 58.

Pulses B, derived from the first servo loop, are applied to a sweep generator 62 and serve to cause the sweep generator 62 to produce sweep excursions, each of which is initiated a short time before each of the master pulses A.

The adjustable delay circuit 60 is adjusted so that both pulses which appear on the screen of the cathode-ray tube 58 are coincident, and the time-delay $t$ between the master and slave pulses is equal to the delay introduced by the adjustably delay circuit 60.

If desired, both the pulses J and T may be applied directly to the vertical deflecting plates of the cathode-ray tube 58, and the time-delay $t$ is then determined by the spacing between the two pulses on the screen of the cathode-ray tube 58. This may be accomplished with the apparatus shown in Fig. 1 by setting adjustable delay delay circuit 60 so that no delay is introduced.

It will be observed that the master and slave pulses are sampled during the leading edges of the respective pulses so that the sampling process is not effected by skywave interference which, on conventional Loran systems, usually occurs about 50 microseconds after the direct wave signal is received.

Furthermore, it will be observed that the various servo loops employ large time-constant filter circuits so as to minimize the effects of random noise signals.

It will be apparent that various modifications can be made in the apparatus disclosed herein. For example, variable delay circuit 56 could be replaced by a frequency controlled oscillator and pulse generator such as shown in Fig. 3 or in Fig. 4, various types of well-known circuits may be employed instead of the four diode type pulse wave coincidence circuits or instead of the variable-delay one-shot multivibrator type slope controlled variable delay circuits described herein, and the output pulses J and T may be employed to actuate apparatus for automatically indicating the position of the craft on which the receiving system is located.

Also, it will be apparent that my invention may be employed in various other types of systems in which a series of pulses are produced in synchronism with recurrent control pulses.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, a receiver for receiving and detecting recurrent pulses of electromagnetic energy, means connected to the output of said receiver for producing a signal which varies in accordance with the rate of increase in the magnitude of the respective control pulses, and pulse generator means having an input circuit connected to the output of said receiver and having a control circuit responsive to said signal and having an output circuit for producing a series of pulses in synchronism with said control pulses.

2. In a synchronizer system having an input circuit responsive to recurrent control pulses, means connected to said input circuit for producing a control voltage having a magnitude which varies in accordance with the rate of increase in the magnitude of the respective control pulses, and a variable pulse generator having a control circuit responsive to said control voltage and having an output circuit for producing a series of pulses in synchronism with said control pulses.

3. In combination, a source of recurrent control pulses, a sampling circuit connected to said source for instantaneously sampling the magnitude of each of said control pulses twice during the leading edges of the pulses at times separated by a predetermined interval of time to produce two voltages of variable magnitude, and means for comparing the relative magnitudes of said two voltages.

4. In a pulse slope measuring system having an input circuit responsive to recurrent control pulses, means connected to said input circuit for instantaneously sampling the magnitude of each of said control pulses twice at times separated by a predetermined interval of time to produce two control voltages, means connected to the control circuit of said first named means and responsive to one of said control voltages for actuating said sampling means when the respective control pulses attain a predetermined magnitude, and means for measuring the magnitude of the other control voltage.

5. In a synchronizer system having an input circuit responsive to recurrent control pulses, a pulse generator connected to said input circuit for producing a series of pulses which have a predetermined time relation to said control pulses, and a delay circuit responsive to said series of pulses and to the rate of increase in the magnitude of the respective control pulses at a predetermined time with respect to the time when each pulse of said series of pulses occurs for producing pulses delayed with respect to the respective pulses of said series a time which varies in accordance with said rate of increase.

6. In combination, a generator for producing recurrent control pulses, means connected to said generator for instantaneously sampling the magnitude of each of said control pulses twice at times separated by a predetermined interval of time to produce two control voltages, and a servo system including a pulse generator responsive to said two control voltages for producing a series of pulses in synchronism with said control pulses.

7. In a servo system having an input circuit responsive to recurrent control pulses, means connected to said input circuit and including a pulse generator for instantaneously sampling the magnitude of each of said control pulses twice during the leading edge of each pulse at times separated by a predetermined interval of time to produce first and second control voltages, one of said control voltages serving to control the frequency of said pulse generator, and a delay circuit responsive to the other of said control voltages and connected to the output of said pulse generator for producing pulses delayed with respect to the respective pulses produced by said generator a time which increases with the magnitude of said other control voltage.

8. Apparatus for measuring the rate of increase in the magnitude of recurrent control pulses, comprising a pair of pulse wave coincidence circuits having their input circuits connected in parallel to receive said control pulses, a delay circuit interconnecting the control circuits of said pair of pulse wave coincidence circuits, a servo circuit interconnecting the output and the control circuit of one of said pulse wave coincidence circuits for instantaneously producing an activating signal for said pair of pulse wave coincidence circuits when each of said control pulses attains a predetermined magnitude, and means for comparing the relative magnitudes of the signals produced at the outputs of said pair of pulse wave coincidence circuits.

9. In combination, means for producing recurrent control pulses, means connected to said first means for instantaneously sampling the magnitude of each of said control pulses during two sampling periods separated by a predetermined interval of time to produce two control voltages respectively having magnitudes variable in accordance with the magnitude of said control pulses during the respective sampling periods, a pulse generator responsive to the control voltage corresponding to the earlier of the two sampling periods for producing a series of pulses in synchronism with said control pulses, and a variable delay circuit responsive to said series of pulses and to the control voltage corresponding to the later of the two sampling periods for producing pulses delayed with respect to the respective pulses of said series a time which varies with the rate of increase in the magnitude of the respective control pulses during each of said predetermined intervals of time.

10. In combination, a source of recurrent control pulses, a first sampling circuit connected to the output of said source of control pulses, a pulse generator having a control circuit for varying the frequency of the pulses produced thereby, said pulse generator being adapted to produce a series of pulses having a repetition rate equal to that of the control pulses, a large time-constant filter interconnecting the control circuit of said pulse generator and the output of said first sampling circuit, means interconnecting the output of said pulse generator and the control circuit of said first sampling circuit for instantaneously activating said first sampling circuit in response to each pulse produced by said pulse generator, a second sampling circuit connected to the output of said source of control pulses, means interconnecting the output of said pulse generator and the control circuit of said second sampling circuit for instantaneously activating said second sampling circuit a predetermined time after said first sampling circuit is activated, a variable delay circuit connected to the output of said pulse generator and having a control circuit for varying the delay introduced thereby, and a large time-constant filter interconnecting the control of said variable delay circuit and the output of said second sampling circuit.

11. In combination, a source of recurrent control pulses, a pair of pulse wave coincidence circuits having their input circuits connected in parallel and to said source of control pulses, a delay circuit interconnecting the control circuits of said pair of pulse wave coincidence circuits, a servo circuit including a pulse generator interconnecting the output and control circuits of the first of said pulse wave coincidence circuits for instantaneously producing an activating signal for said pair of pulse wave coincidence circuits when each of said control pulses attains a predetermined magnitude, said pulse generator being responsive to the output of said first pulse wave coincidence circuit and serving to produce a series of pulses in synchronism with said control pulses, and a variable delay circuit responsive to the outputs of said pulse generator and the second of said pulse wave coincidence circuits for producing pulses delayed with respect to each pulse of said series by a time which increases with the magnitude of the signal produced by said second pulse wave coincidence circuit.

12. Apparatus for measuring the rate of increase in the magnitude of recurrent pulses, comprising an input circuit for said recurrent pulses, a pulse generator having a control circuit for varying the frequency of the pulses produced thereby, a servo circuit connected to said input circuit and including said control circuit for causing said pulse generator to produce a series of pulses in which each pulse of said series is caused to occur when the respective recurrent pulses attain a predetermined magnitude, a sampling circuit connected to said input circuit, and a delay circuit interconnecting the output of said pulse generator and the control circuit of said sampling circuit for activating said sampling circuit in response to each pulse produced by said pulse generator, thereby causing said sampling circuit to produce a signal which varies in accordance with the rate of increase in the magnitude of the respective control pulses.

13. In combination, a source of recurrent control pulses, a pulse generator having a control circuit for varying the frequency of the pulses produced thereby, a servo circuit connected to said source of recurrent pulses and including said control circuit for causing said pulse generator to produce a series of pulses in which each pulse of said series is caused to occur when the respective recurrent pulses attain a predetermined magnitude, a sampling circuit connected to said source of recurrent pulses, a delay circuit interconnecting the output of said pulse generator and the control circuit of said sampling circuit for activating said sampling circuit during each of said control pulses in response to each pulse produced by said pulse generator, a variable delay circuit connected to the outputs of said pulse generator and said sampling circuit for producing pulses delayed with respect to each pulse produced by said generator a time which increases with the magnitude of the signal produced by said sampling circuit, and an indicator connected to the outputs of said variable delay circuit and said pulse generator for showing the time relationship between the pulses produced by said pulse generator and the pulses produced by said variable delay circuit.

14. In a radio system employing a pair of transmitters to produce two series of pulse-modulated electromagnetic waves having predetermined time relationships, a receiver adapted to detect said waves, a first generator connected to the output of said receiver and responsive to the rate of increase in the magnitude of the respective pulses of one series of the detected waves for producing a first series of pulses coincident with the pulses of said one series, and a second generator connected to the output of said receiver and responsive to the rate of increase in the magnitude of the respective pulses of the other series of the detected waves for producing a second series of pulses coincident with the pulses of said other series.

15. The apparatus of claim 14 further including means connected to the outputs of said first and second generators for comparing the time-delay between said first and second series of pulses.

16. In a radio system employing a pair of transmitters to produce a first and a second series of pulse-modulated electromagnetic waves having predetermined time relationships, a receiver adapted to detect said waves and produce pulses corresponding to said first and second series of pulses respectively in separate output channels, a first sampling circuit connected to one of said output channels for instantaneously sampling the magnitude of each of the pulses of said first series twice during the leading edges of the pulses at times separated by a predetermined interval of time to produce a first pair of voltages of variable magnitude, a second sampling circuit connected to the other of said output channels for instantaneously sampling the magnitude of each of the pulses of said second series twice during the leading edges of the pulses at times separated by a predetermined interval of time and at times delayed a predetermined time after the sampling periods of said first sampling circuit to produce a second pair of voltages of variable magnitude, and means for comparing the relative magnitudes of the difference in potential between said first pair of voltages and the difference in potential between said second pair of voltages.

17. In a radio system employing a pair of transmitters to produce a first and a second series of pulse-modulated electromagnetic waves having predetermined time relationships, a receiver adapted to detect said waves and produce pulses corresponding to said first and second series of pulses respectively in separate output channels, a first pulse generator connected to one of said output channels for producing a series of pulses which have a predetermined time relation to said first series of pulses, a first delay circuit responsive to the rate of increase in the magnitude of the respective pulses of first series at a predetermined time with respect to each pulse of the series of pulses produced by said first generator for producing pulses delayed with respect to the respective pulses produced by said first generator a time which varies in accordance with said rate of increase, a second pulse generator connected to the other of said output channels for producing a series of pulses which have a predetermined time relation to said second series of pulses, a second delay circuit responsive to the rate of increase in the magnitude of the respective pulses of said second series at a predetermined time with respect to each pulse of the series of pulses produced by said second generator for producing pulses delayed with respect to the respective pulses produced by said second generator a time which varies in accordance with said rate of increase, and means for comparing the time-delay between the pulses produced by said first and second delay circuits.

References Cited in the file of this patent

UNITED STATES PATENTS

| | | |
|---|---|---|
| 2,418,143 | Stodola | Apr. 1, 1943 |
| 2,497,513 | Paine et al. | Feb. 14, 1950 |